(12) United States Patent
Yuen et al.

(10) Patent No.: US 11,047,681 B2
(45) Date of Patent: Jun. 29, 2021

(54) LEVELLING APPARATUS HAVING AN OSCILLATING LIGHT GENERATION UNIT

(71) Applicant: Robert Bosch GmbH, Stuttgart (DE)

(72) Inventors: Eric Yuen, Hong Kong (CN); Philip Cheung, Hong Kong (CN); John Jiang, Shenzhen (CN)

(73) Assignee: Robert Bosch GmbH, Stuttgart (DE)

( * ) Notice: Subject to any disclaimer, the term of this patent is extended or adjusted under 35 U.S.C. 154(b) by 381 days.

(21) Appl. No.: 16/089,215

(22) PCT Filed: Mar. 1, 2017

(86) PCT No.: PCT/EP2017/054715
§ 371 (c)(1),
(2) Date: Sep. 27, 2018

(87) PCT Pub. No.: WO2017/167525
PCT Pub. Date: Oct. 5, 2017

(65) Prior Publication Data
US 2020/0300625 A1 Sep. 24, 2020

(30) Foreign Application Priority Data
Mar. 29, 2016 (DE) ...................... 10 2016 205 089.3

(51) Int. Cl.
*G01C 15/00* (2006.01)
*G01C 15/06* (2006.01)
(52) U.S. Cl.
CPC ........... *G01C 15/004* (2013.01); *G01C 15/06* (2013.01)
(58) Field of Classification Search
CPC .................................................... G01C 15/004
(Continued)

(56) References Cited

U.S. PATENT DOCUMENTS 5,519,942 A 5/1996 Webb
5,539,990 A 7/1996 Le
(Continued)

FOREIGN PATENT DOCUMENTS

CN 2277081 Y 3/1998
CN 2588326 Y 11/2003
(Continued)

OTHER PUBLICATIONS

International Search Report corresponding to PCT Application No. PCT/EP2017/054715, dated May 29, 2017 (German and English language document) (5 pages).

*Primary Examiner* — Christopher W Fulton
(74) *Attorney, Agent, or Firm* — Maginot, Moore & Beck LLP

(57) ABSTRACT

A levelling apparatus includes a housing, a light generation unit, at least one first lens, a second lens, and a holding apparatus. The light generation unit is arranged in the housing, is mounted in an oscillating manner relative to the housing and has at least one light source, to which the at least one first lens for generating a first light plane and the second lens for generating a second light plane are assigned. The holding apparatus includes a first holding element and a second holding element for arranging the at least one first lens and the second lens. The at least one first lens is arranged on the first holding element and the second lens is arranged on the second holding element. The holding apparatus is configured to orient the at least one first lens and the second lens at least substantially perpendicular to one another.

14 Claims, 3 Drawing Sheets

(58) Field of Classification Search
 USPC .......................................................... 33/290
 See application file for complete search history.

(56) References Cited

U.S. PATENT DOCUMENTS

| | | | | |
|---|---|---|---|---|
| 6,763,595 | B1 | 7/2004 | Hersey | |
| 6,909,551 | B1* | 6/2005 | Liu | G02B 27/0955 33/227 |
| 7,730,624 | B2* | 6/2010 | Nishimura | G01C 15/004 33/286 |
| 7,984,557 | B1 | 7/2011 | Carl | |
| 2004/0025359 | A1* | 2/2004 | Tamamura | G01C 15/004 33/290 |
| 2004/0177523 | A1* | 9/2004 | Chang | G01C 15/004 33/281 |
| 2006/0179672 | A1* | 8/2006 | Tacklind | G01C 15/004 33/286 |
| 2007/0124947 | A1 | 6/2007 | Munroe et al. | |
| 2007/0271800 | A1* | 11/2007 | Hersey | G01C 15/004 33/286 |
| 2008/0028624 | A1* | 2/2008 | Chen | G01D 11/30 33/286 |
| 2008/0078091 | A1 | 4/2008 | McCracken | |
| 2009/0193671 | A1* | 8/2009 | Sergyeyenko | G01C 15/02 33/290 |
| 2013/0167386 | A1* | 7/2013 | Peng | G01C 15/004 33/290 |
| 2014/0352161 | A1 | 12/2014 | Ranieri et al. | |
| 2015/0000144 | A1* | 1/2015 | Yuen | G01B 7/30 33/228 |
| 2015/0292886 | A1* | 10/2015 | Bascom | G01C 15/004 33/291 |
| 2018/0106616 | A1* | 4/2018 | Jiang | H01S 5/06216 |
| 2019/0072385 | A1* | 3/2019 | Lombardi | G01C 15/008 |

FOREIGN PATENT DOCUMENTS

| | | |
|---|---|---|
| CN | 101038166 A | 9/2007 |
| CN | 101078623 A | 11/2007 |
| CN | 102449502 A | 5/2012 |
| DE | 93 07 359 U1 | 9/1993 |
| DE | 20 2007 007 193 U1 | 9/2007 |
| EP | 1 795 863 A2 | 6/2007 |
| WO | 2010/136233 A1 | 12/2010 |

* cited by examiner

LEVELLING APPARATUS HAVING AN OSCILLATING LIGHT GENERATION UNIT

This application is a 35 U.S.C. § 371 National Stage Application of PCT/EP2017/054715, filed on Mar. 1, 2017, which claims the benefit of priority to Serial No. DE 10 2016 205 089.3, filed on Mar. 29, 2016 in Germany, the disclosures of which are incorporated herein by reference in their entirety.

BACKGROUND

The present disclosure relates to a leveling apparatus with a housing and with a light-generating unit arranged in the housing, said light-generating unit being supported in oscillating manner relative to the housing and exhibiting at least one light-source to which at least one first lens, for generating a first plane of light, and one second lens, for generating a second plane of light, are assigned.

From the state of the art a leveling apparatus of such a type is known which exhibits a housing and a light-generating unit arranged in the housing. The light-generating unit in this case is supported in oscillating manner relative to the housing and exhibits at least one light-source. In this case at least one first lens, for generating a first plane of light, and one second lens, for generating a second plane of light, are preferably assigned to the at least one light-source. The first lens is preferably oriented perpendicularly to the second lens, both lenses being arranged in a common holding element. For the purpose of arranging the two lenses the holding element exhibits a T-shaped recess which requires high manufacturing accuracy in order to orient the two lenses perpendicularly to one another.

SUMMARY

The present disclosure makes available a novel leveling apparatus with a housing and with a light-generating unit arranged in the housing, said light-generating unit being supported in oscillating manner relative to the housing and exhibiting at least one light-source to which at least one first lens, for generating a first plane of light, and one second lens, for generating a second plane of light, are assigned. A holding apparatus with a first and a second holding element is provided for the purpose of arranging the first and second lenses, the first lens being arranged on the first holding element, and the second lens being arranged on the second holding element, and the holding apparatus being designed to orient the first and second lenses at least substantially perpendicularly to one another.

The disclosure consequently enables the provision of a leveling apparatus in which a rapid and simple orientation of the two lenses relative to one another can be made possible by virtue of the first and second holding elements. Consequently the two lenses can easily be exactly oriented relative to one another, so that manufacturing tolerances of the holding elements can be compensated securely and reliably.

The first and second holding elements are preferentially capable of being rotated for the purpose of orienting the first and second lenses relative to one another. Consequently a rapid and straightforward orientation of the two holding elements relative to one another can be made possible, the two lenses being oriented relative to one another.

The first and second holding elements preferably respectively exhibit a positioning socket for the at least partial accommodation of the first or second lens. Consequently the two lenses can respectively be securely and reliably arranged on the assigned holding element.

According to one embodiment, the positioning sockets respectively exhibit at least one positioning element for positioning the first or second lens. Consequently a holding element can be made available in which a precise and exact arrangement of the respective lens can be made possible.

The positioning socket of the first holding element is preferentially arranged in a first direction of the holding apparatus, and the positioning socket of the second holding element is preferably arranged in a second direction of the holding apparatus, the first direction being arranged at least approximately orthogonally to the second direction. Consequently the at least substantially perpendicular arrangement of the two lenses relative to one another can easily be made possible.

The first and second holding elements preferentially respectively exhibit a socket for the at least partial accommodation of the first or second lens arranged in the respective other holding element. Consequently a stable and robust arrangement of the two lenses in the holding elements can be made possible.

The sockets are preferably larger than the positioning sockets and/or the first and/or second lens. Consequently the arrangement of the two lenses in the sockets of the holding elements can be made possible in simple and straightforward manner.

In at least one holding element the positioning socket and the socket preferably form a contiguous T-shaped opening. Consequently the formation of a compact socket that is easy to manufacture can be made possible.

According to one embodiment, at least one holding element exhibits an operating element for orienting the first and second holding elements relative to one another. Consequently an orientation of the holding elements relative to one another can easily be made possible.

The first lens is preferentially connected to the first holding element via an adhesive-bonded joint, and/or the second lens is preferably connected to the second holding element via an adhesive-bonded joint. Consequently a stable and robust connection of a lens to the assigned holding element can be made possible.

The first and second holding elements preferably respectively exhibit a disk-shaped base body and/or are preferentially arranged coaxially relative to one another. Consequently holding elements having a suitable shape for the purpose of orientation relative to one another can be made available.

According to one embodiment, the first and second holding elements are connected to one another via an adhesive-bonded joint, at least one holding element exhibiting at least one recess for the purpose of arranging an adhesive agent. Consequently the holding elements can be securely fixed relative to one another in their oriented position.

The first and/or second lens is/are preferably designed in the manner of a cylindrical lens. Consequently a suitable lens can easily be made available.

In addition, the disclosure makes available a holding apparatus for a leveling apparatus which exhibits a housing and a light-generating unit arranged in the housing, said light-generating unit being supported in oscillating manner relative to the housing and exhibiting at least one light-source to which at least one first lens, for generating a first plane of light, and one second lens, for generating a second plane of light, are assigned. A holding apparatus with a first and a second holding element is provided for the purpose of arranging the first and second lenses, the first lens being arranged on the first holding element, and the second lens being arranged on the second holding element, and the holding apparatus being designed to orient the first and second lenses at least substantially perpendicularly to one another.

The disclosure consequently enables the provision of a holding apparatus for a leveling apparatus in which a rapid and simple orientation of the two lenses relative to one another can be made possible by virtue of the first and second holding elements. Consequently the two lenses can easily be exactly oriented relative to one another, so that manufacturing tolerances of the holding elements can be compensated securely and reliably.

BRIEF DESCRIPTION OF THE DRAWINGS

The disclosure is elucidated in more detail in the following description on the basis of embodiment examples represented in the drawings. Shown are.

DETAILED DESCRIPTION

Figure 1:
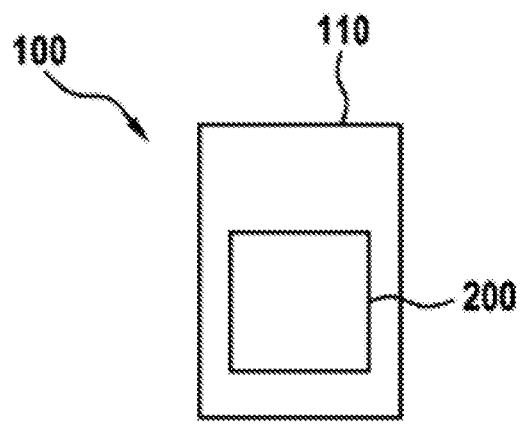
FIG. 1 a schematic view of an exemplary leveling apparatus with a light-generating unit, FIG. 2 a perspective view of the light-generating unit of FIG. 1, FIG. 3 a perspective view of a holding apparatus assigned to the light-generating unit of FIG. 1 and FIG. 2, FIG. 4 an exploded view of the holding apparatus of FIG. 3, FIG. 5 a front view of the holding apparatus of FIG. 3 and FIG. 4, and FIG. 6 a sectional view of the holding apparatus of FIG. 5, viewed in the direction of arrows VI-VI in FIG. 5.

FIG. 1 shows an exemplary leveling apparatus 100 with a housing 110 and with a light-generating unit 200 arranged in the housing 110. The housing 110 preferentially features synthetic material and preferably takes the form of a shell-type housing produced by injection molding of synthetic material. The light-generating unit 200 in this case is preferentially supported in oscillating manner relative to the housing 110 and preferably exhibits at least one light-source (220 in FIG. 2). A leveling signal generated by the light-generating unit 200 is preferentially radiated from the housing 110 through a window integrated into the housing 110. The light-generating unit 200 in this case is preferably capable of being operated independently of the mains via a storage battery, but may also be operated in mains-dependent manner.

Figure 2:
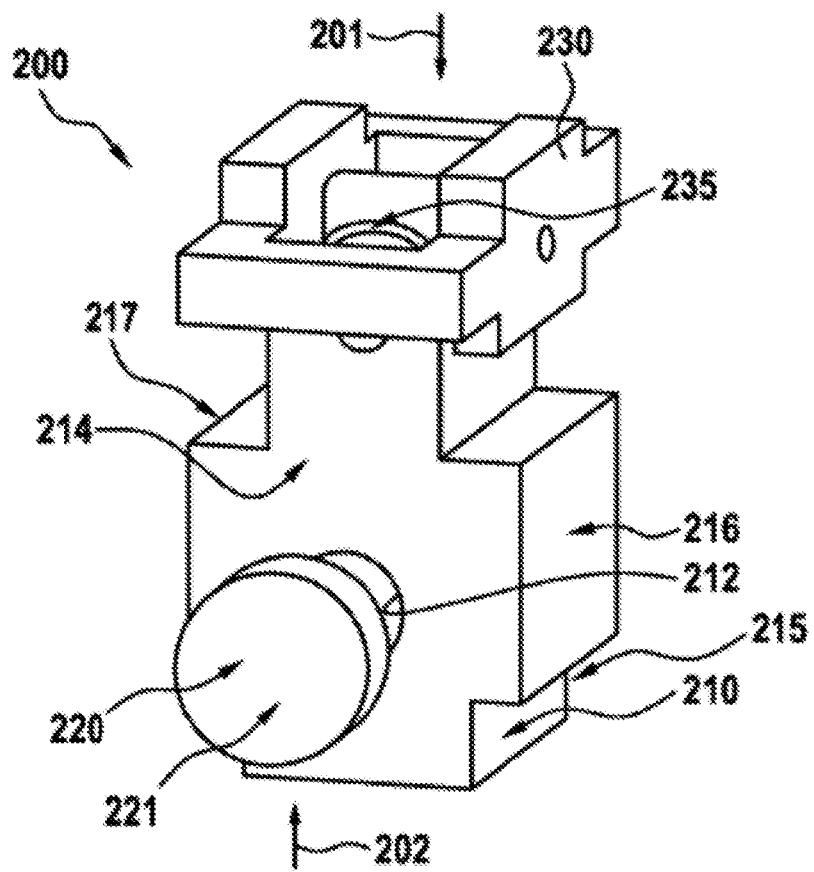

FIG. 2 shows the light-generating unit 200 of FIG. 1 with a first and a second end 201, 202. The light-generating unit 200 preferentially exhibits a base body 210, which in the illustration takes the form of a cross but may also have any other shape, for example a rectangular shape. In this case the base body 210 preferentially has a front side 214, a rear side 215 and also a first in the illustration, right lateral face 216 and a second—in the illustration, left—lateral face 217. At its first end 201 the light-generating unit 200 exhibits an oscillating element 230 with, preferably, a universal joint 235 which arranges the light-generating unit 200 in oscillating manner in the housing 110.

The light-generating unit 200 preferentially exhibits at least one light-source 220. The light-source 220 is preferably designed in the manner of a laser diode and will hereinafter be designated as "the laser diode 220". It should be noted that the illustrative configuration of the light-generating unit 200 with one light-source 220 has merely exemplary character and is not to be regarded as a limitation of the disclosure. Accordingly, the light-generating unit 200 may also exhibit more than one light-source 220, for example two light-sources. The laser diode 220 in this case has preferentially been designed to emit at least one vertical and/or one horizontal plane of light in operation. For this purpose, at least one first lens (330 in FIG. 3), for generating a first plane of light, and one second lens (340 in FIG. 3), for generating a second plane of light, are preferably assigned to the laser diode 220. The first and second planes of light in this case preferentially form the leveling signal.

For the purpose of arranging the at least one laser diode 220 on the base body 210, the latter exhibits in the illustration, and preferentially on its front side 214, at least one socket 212. The socket 212 has preferably been formed partially in the base body 210, but could also have been formed continuously from the front side 214 to the rear side 215.

It should be noted that the arrangement of the socket 212 on the front side 214 has merely exemplary character and is not to be regarded as a limitation of the invention. Accordingly, the socket 212 may also have been formed on the rear side 215 and/or on a lateral face 216, 217. In addition, one socket may also have been arranged on one side, for example front/rear side or lateral face, of the base body 210, and a second or further socket may have been arranged on a further side, for example lateral face or front/rear side. In this case, a light outlet 221 of the laser diode 220 is arranged pointing away from the base body 210, or arranged in such a manner that the leveling signal leaves the housing 110 preferentially via a window.

Figure 3:
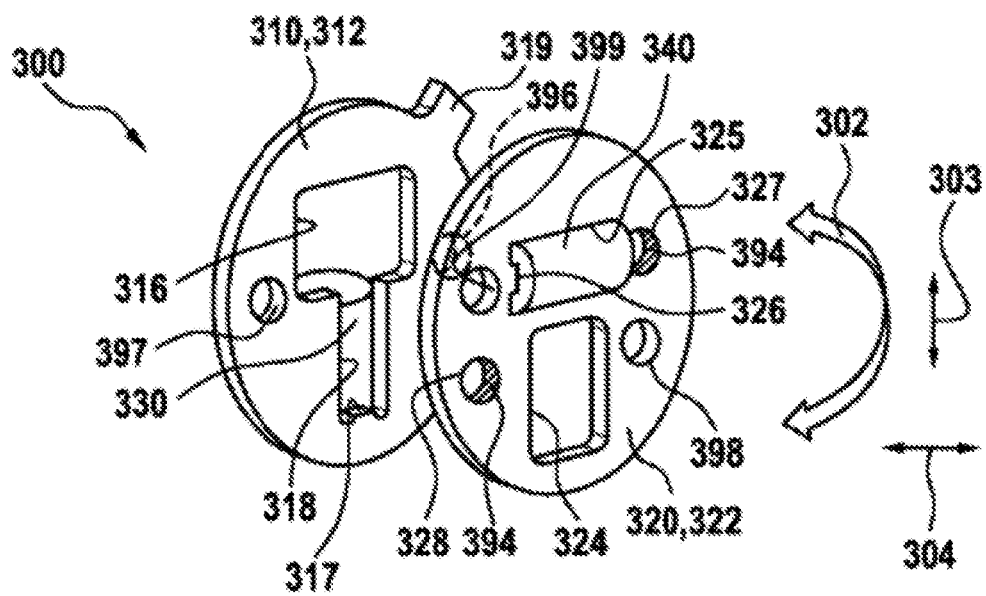

FIG. 3 shows a holding apparatus 300 assigned to the light-generating unit 200 of FIG. 1 and FIG. 2. Said holding apparatus preferentially exhibits a first and a second holding element 310, 320 and is designed for the purpose of arranging at least one first and second lens 330, 340. The holding elements 310, 320 preferentially have a disk-shaped base body 312, 322, but the holding elements 310, 320 may also have any other base body, for example an oval or angular body. In addition, the two holding elements 310, 320 are preferably arranged coaxially relative to one another. In this case, at least one holding element 310, 320—in the illustration, the first holding element 310—exhibits an operating element 319 for orienting the first and second holding elements 310, 320 relative to one another.

The preferentially two lenses 330, 340 are, as described above, preferably assigned to the laser diode 220 and designed for generating a first and a second plane of light which preferably jointly form the leveling signal of the leveling apparatus 100. The two lenses 330, 340 are preferentially each designed in the manner of a cylindrical lens. According to one embodiment, the first lens 330 is arranged on the first holding element 310, and the second lens 340 is arranged on the second holding element 320.

The holding apparatus 300 is preferentially designed to orient the first and second lenses 330, 340 in each instance at least substantially perpendicularly, and in particular preferably perpendicularly to one another. For this purpose the first and second holding elements 310, 320 are capable of being rotated relative to one another, preferably in the direction of an arrow 302, for the purpose of orienting the first and second lenses 330, 340. It should be noted that the two lenses 330, 340 may also be arranged or oriented, deviating from the embodiment example shown, at any other predetermined angle relative to one another.

According to one embodiment, at least one holding element 310, 320—preferably both holding elements 310, 320—exhibits a respective positioning socket 318, 325 for the at least partial accommodation of the assigned lens 330, 340. In this case, the positioning socket 318 arranged on the first holding element 310 is designed for the at least partial accommodation of the first lens 330, and the positioning socket 325 arranged on the second holding element 320 is designed for the at least partial accommodation of the second lens 340.

The positioning sockets 318, 325 respectively preferably exhibit at least one positioning element 317, 326 for positioning the assigned lens 330, 340 in the positioning socket 318, 325. The positioning socket 318 of the first holding element 310 is preferentially arranged in a first direction 303 of the holding apparatus 300, and the positioning socket 325 of the second holding element 320 is preferentially arranged in a second direction 304 of the holding apparatus 300. In this connection, the first direction 303 is preferably oriented at least approximately orthogonally to the second direction 304. As a result, the first lens 330 is arranged in the first direction 303 of the holding apparatus 300, and the second lens 340 is arranged in the second direction 304 of the holding apparatus 300. However, the two directions 303, 304 may also have been oriented at any other predetermined angle relative to one another.

In addition, at least one holding element 310, 320—preferably both holding elements 310, 320—respectively exhibits a socket 316, 324 for the at least partial accommodation of the first or second lens 340, 330 arranged in the respective other holding element 320, 310. In this case, the sockets 316, 324 are preferentially larger than the positioning sockets 318, 325 and/or the first and/or second lens 330, 340. In the case of at least one holding element 310, 320—in the illustration, in the case of the first holding element 310—positioning socket 318 and socket 316 are preferably formed contiguously, a preferably T-shaped opening 316 being formed. However, the contiguous opening 316 may also have any other shape which is preferably dependent on an orientation of the two sockets 316, 318 relative to one another.

The first and second holding elements 310, 320 are preferentially connected to one another via an adhesive-bonded joint, in which case at least one holding element 310, 320 exhibits at least one recess 396, 397; 327, 328, 398, 399 for the purpose of arranging an adhesive agent 394. At least in the region of the positioning socket 318, 325 and/or in the region of the socket 316, 324, a recess 396, 397; 327, 328, 398, 399 is preferably arranged for the purpose of arranging the adhesive agent 394.

For the purpose of illustration, the adhesive agent 394 is arranged in FIG. 3 to the right of positioning socket 325 and to the left of socket 324, or, to be more exact, in the recesses 327, 328 of the second holding element 320. However, the adhesive agent 394 may also have been arranged in the recesses 396, 397, 398, 399. The adhesive agent 394 preferably takes the form of a high-strength adhesive agent which preferentially has a low viscosity.

Figure 4:
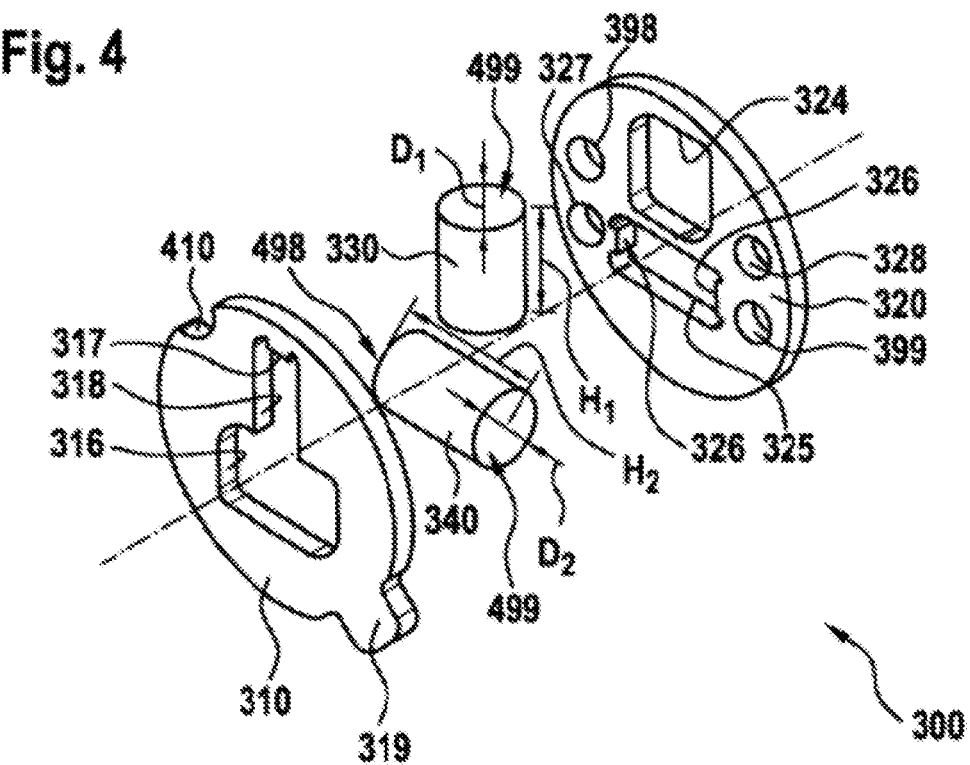

FIG. 4 shows the holding apparatus 300 of FIG. 3 and illustrates the two lenses 330, 340 taking the form of cylindrical lenses. In this case, the first cylindrical lens 330 preferentially has a diameter $D_1$ and a height $H_1$, and the second cylindrical lens 340 preferably has a diameter $D_2$ and a height $H_2$. The two cylindrical lenses 330, 340 are preferentially of identical design but may also have different diameters $D_1$, $D_2$ and/or heights $H_1$, $H_2$.

Furthermore, FIG. 4 illustrates the first holding element 310 of FIG. 3, which, according to a further embodiment, exhibits a recess 410 on its outer periphery. In the illustration, the recess 410 has been formed opposite the operating element 319 of FIG. 3 but could also have been arranged at any other place on the outer periphery of the first holding element 310. The recess 410 has preferentially been designed for separating the adhesive-bonded joint between the two holding elements 310, 320 of FIG. 3, in which case the second holding element 320 preferably has a force applied to it.

In addition, FIG. 4 illustrates the positioning element 317 of the first holding element 310 of FIG. 3 and the preferentially two positioning elements 326 of the second holding element 320 of FIG. 3. In this case, the two positioning elements 326 are arranged opposite one another in positioning socket 325. The positioning element 317 preferentially positions the first cylindrical lens 330 on its upper side 499, and the positioning elements 326 of the second holding element 320 preferentially position the second cylindrical lens 340 on its upper and lower sides 499, 498, or, to be more exact, laterally in FIG. 4 for the purpose of illustration.

Figure 5:
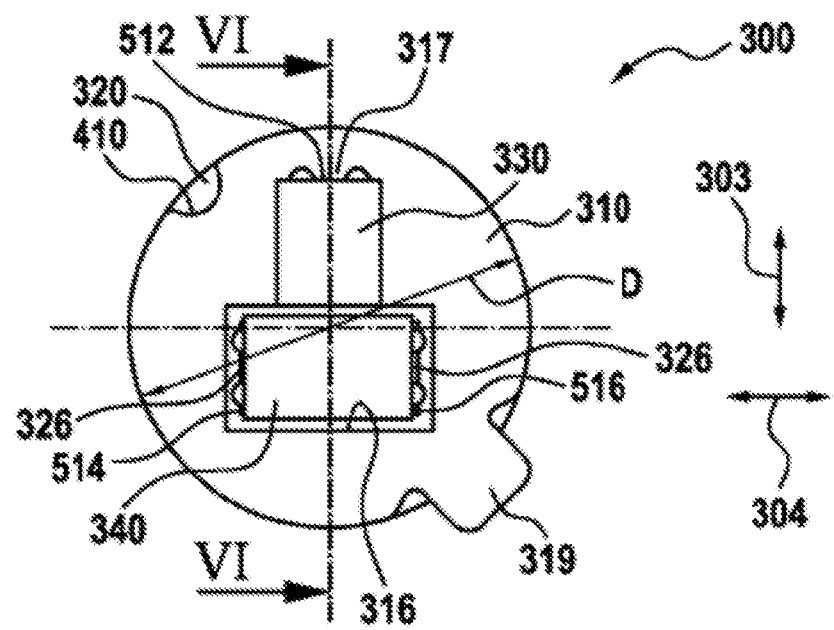

FIG. 5 shows the holding apparatus 300 of FIG. 3 and FIG. 4 and illustrates a diameter D of the preferentially identically designed, preferably disk-shaped, holding elements 310, 320. The diameter D is preferentially less than 20 mm, preferably 12 mm with a tolerance of ±0.1 mm. However, the diameter D may also be smaller or larger and may have an arbitrary tolerance.

In addition, the first cylindrical lens 330 is preferably connected to the first holding element 310 via an adhesive-bonded joint 512, and/or the second cylindrical lens 340 is connected to the second holding element 320 via an adhesive-bonded joint 514, 516. In this case, the adhesive-bonded joints 512, 514, 516 are preferentially arranged on the positioning elements 317 and 326, respectively, and fix the cylindrical lenses 330, 340 to the holding elements 310, 320. The adhesive-bonded joints 512, 514, 516 preferably exhibit a structural adhesive for forming an adhesive-bonded joint between metal and glass, said structural adhesive exhibiting a preferentially low viscosity and preferably a high clarity or transparency. The structural adhesive preferentially takes the form of a UV industrial adhesive.

Figure 6:
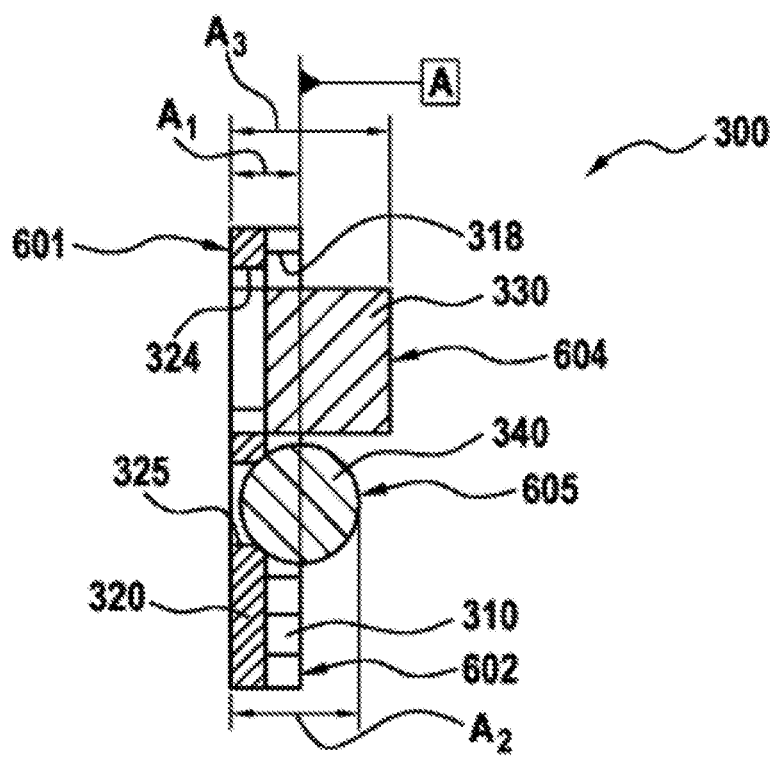

FIG. 6 shows the holding apparatus of FIG. 3 to FIG. 5 with a first and a second side 601, 602, and illustrates the arrangement of the cylindrical lenses 330, 340 in the positioning sockets 318, 325. In addition, in the illustration and preferentially, the second side 602 of the holding apparatus 300 of FIG. 3 to FIG. 5, or, to be more exact, a side of the first holding element 310 facing away from the second holding element 320, takes the form of a reference axis A of the holding apparatus 300. An outside 604 assigned to the first cylindrical lens 330 preferentially exhibits parallelism relative to the reference axis A, said outside 604 preferably being located between two surfaces which are parallel to the reference axis A and have a spacing of 0.02 mm, or, to be more exact, exhibits parallelism relative to the reference axis A with a tolerance of 0.02 mm. Furthermore, an outside 605 assigned to the second cylindrical lens 340 exhibits parallelism relative to the reference axis A, said outside 605 preferably being located between two surfaces which are parallel to the reference axis A and have a spacing of 0.03 mm, or, to be more exact, exhibits parallelism relative to the reference axis A with a tolerance of 0.03 mm.

In addition, the holding apparatus 300 of FIG. 3 to FIG. 5 preferably exhibits a first spacing $A_1$, taking the form of thickness, which is formed from the first to the second side 601, 602 and preferentially amounts to 1.6 mm±0.2 mm. Furthermore, the holding apparatus 300 exhibits a second and a third spacing $A_2$, $A_3$. In this case, the second spacing $A_2$ is formed between the first side 601 and the outside 604 of the first cylindrical lens 330. The third spacing $A_3$ is preferentially formed between the first side 601 and the outside 605 of the second cylindrical lens 340 and preferably amounts to 3.163 mm. It should be noted that the described dimensions and tolerances have merely exemplary character and are not to be regarded as a limitation of the disclosure.

The invention claimed is:

1. A leveling apparatus, comprising:
a housing;
a light-generating unit arranged in the housing, the light-generating unit supported in an oscillating manner relative to the housing and including at least one light-source;
at least one first lens configured to generate a first plane of light and assigned to the at least one light-source;
a second lens configured to generate a second plane of light and assigned to the at least one light-source; and
a holding apparatus separate from said light-generating unit and from said at least one first lens and said second lens, and including a first holding element and a second holding element configured to orient the at least one first lens and the second lens at least substantially perpendicularly to one another, and configured to accommodate the at least one first lens and the second lens, the at least one first lens arranged on the first holding element, and the second lens arranged on the second holding element.

2. The leveling apparatus as claimed in claim 1, wherein the first and second holding elements each define an axis of rotation and are configured to rotate about said axis of rotation in order to orient the at least one first lens and the second lens relative to one another.

3. The leveling apparatus as claimed in claim 1, wherein the first and second holding elements respectively include a positioning socket configured to at least partially accommodate the at least one first lens or the second lens.

4. The leveling apparatus as claimed in claim 3, wherein the positioning sockets respectively include at least one positioning element configured to position the at least one first lens or the second lens.

5. The leveling apparatus as claimed in claim 3, wherein:
the positioning socket of the first holding element is arranged in a first direction of the holding apparatus;
the positioning socket of the second holding element is arranged in a second direction of the holding apparatus; and
the first direction is at least approximately orthogonal to the second direction.

6. The leveling apparatus as claimed in claim 3, wherein:
the first holding element includes a socket configured to at least partially accommodate the at least one first lens or the second lens arranged in the second holding element; and
the second holding element includes a socket configured to at least partially accommodate the at least one first lens or the second lens arranged in the first holding element.

7. The leveling apparatus as claimed in claim 6, wherein the sockets are larger than the positioning sockets and/or the at least one first lens and/or the second lens.

8. The leveling apparatus as claimed in claim 6, wherein the positioning socket and the socket of at least one of the first and second holding elements form a contiguous T-shaped opening.

9. The leveling apparatus as claimed in claim 1, wherein at least one of the first and second holding elements includes an operating element configured to orient the first and second holding elements relative to one another.

10. The leveling apparatus as claimed in claim 1, wherein the at least one first lens is connected to the first holding element via an adhesive-bonded joint, and/or the second lens is connected to the second holding element via an adhesive-bonded joint.

11. The leveling apparatus as claimed in claim 1, wherein the first and second holding elements respectively include a disc-shaped base body and/or are arranged coaxially relative to one another.

12. The leveling apparatus as claimed in claim 11, wherein:
the first and second holding elements are connected to one another via an adhesive-bonded joint; and
at least one of the first and second holding elements includes at least one recess configured to accommodate an adhesive agent.

13. The leveling apparatus as claimed in claim 1, wherein the at least one first lens and/or the second lens is configured as a cylindrical lens.

14. A holding system, comprising:
a leveling apparatus including:
a housing;
a light-generating unit arranged in the housing, the light-generating unit supported in an oscillating manner relative to the housing and including at least one light-source;
at least one first lens configured to generate a first plane of light and assigned to the at least one light-source;
a second lens configured to generate a second plane of light and assigned to the at least one light-source; and
a holding apparatus separate from said light-generating unit and from said at least one first lens and said second lens, and including a first holding element and a second holding element configured to orient the at least one first lens and the second lens at least substantially perpendicularly to one another, and configured to accommodate the at least one first lens and the second lens, the at least one first lens arranged on the first holding element and the second lens arranged on the second holding element.

* * * * *